C. S. E. VOSS.
BELT FASTENER.
APPLICATION FILED JULY 2, 1919.
1,401,506.
Patented Dec. 27, 1921.
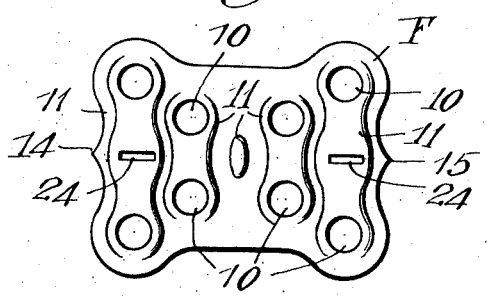
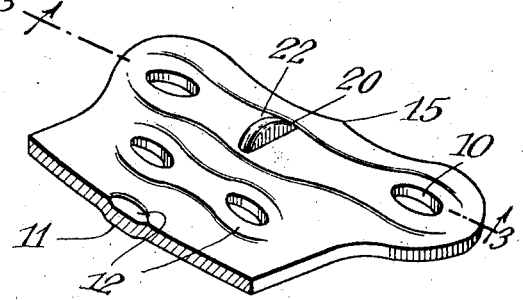
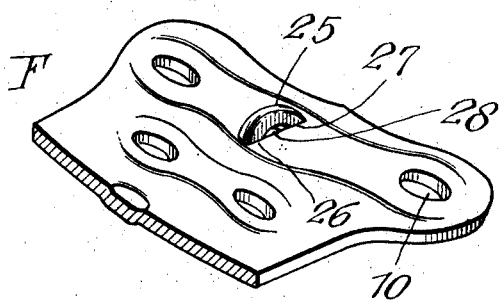
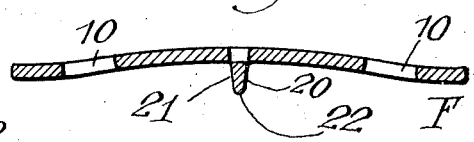
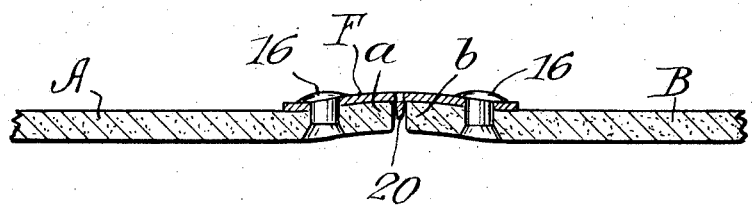
Clara S. Eaton Voss INVENTOR
BY Cornelius C. Billings
her ATTORNEY

UNITED STATES PATENT OFFICE.

CLARA S. EATON VOSS, OF NEW YORK, N. Y., ASSIGNOR TO CRESCENT BELT FASTENER COMPANY, OF NEW YORK, N. Y., A CORPORATION OF NEW JERSEY.

BELT-FASTENER.

1,401,506.   Specification of Letters Patent.   Patented Dec. 27, 1921.

Application filed July 2, 1919. Serial No. 308,097.

*To all whom it may concern:*

Be it known that I, CLARA S. EATON VOSS, a citizen of the United States, and a resident of the borough of Manhattan, city and State of New York, have invented certain new and useful Improvements in Belt-Fasteners, of which the following is a specification.

This invention relates to devices for fastening together the ends of belts used for transmitting power to drive machinery, and to the method of making the same.

The principal object of the invention is to provide novel means consisting of lips or lugs extending from the under side of a belt-fastener, so located and arranged as to center the fastener against the ends of the belt, which are to be joined together, thereby causing the fastener to be secured to the belt ends in a truly alined position.

Another object of the invention is to provide a belt fastener having a centering construction which is easy and rapid of manufacture at a minimum cost, and which at the same time results in a structure which is extremely efficient in use.

Other objects will appear from the subjoined specification and claims.

Referring to the drawings in which the same reference character indicates the same part in the several views:

Figure 1 is a plan view of my improved fastener.

Fig. 2 is a perspective view showing the lower or under side of said fastener, at one end thereof, the other end broken away.

Fig. 3 is a section through the line 3—3 of Fig. 2.

Fig. 4 is a perspective view showing at one end the lower side of my fastener as it appears after the first step is completed in forming the centering lugs or lips.

Fig. 5 is a longitudinal section of a portion of a belt with the fastener applied.

In the drawings, F is a belt fastener which is provided with a series of rivet holes 10 situated at the respective ends of a series of raised portions 11. On the reverse side of the belt fastener immediately under the raised portions 11 is a series of depressions 12. On each outer edge of the short side of the fastener is provided a guiding point 14 and 15 for the purpose of aid to the eye in properly positioning the fastener on the ends of the belt.

On the under side of the fastener I provide a lip or lug 20 situated in the medial longitudinal line thereof which serves as a positive guide for positioning the fastener upon the ends of the belt when it is desired to secure the fastener to the belt by passing the securing rivets 16 through the holes of the fastener into the belt.

I find that a single lug of this kind is sufficient to perform the function desired, but I preferably provide a plurality of lugs, one at each end of the belt fastener situated on the medial longitudinal line of the fastener, which latter is situated transversely of the belt. The lugs have inclined sides 20 and 21 and a cam shaped or curved edge 22, as shown.

In manufacturing the belt fastener I proceed by stamping up a blank of suitable metal provided with corrugations and rivet holes, as shown, in any suitable way, it being understood that the material of the belt fastener may be of any suitable metal which is available having in view its qualities of being worked and its qualities of strength when used as a belt fastener.

I then place the blank in a die and stamp out the metal from the upper surface to extend below the under surface at each end of the longitudinal line to form the cavities 24 in the upper side and the protrusions 25 on the lower side so that they will be alined on the central or medial longitudinal line of the belt fastener, as shown. The protrusion 25 then takes the form of a curved bridge piece or strap as shown in Fig. 4 which is integrally secured at each end 26 and 27 to the under side of the fastener and which leaves an opening 28 passing under the bridge piece 25. The stamped out protrusions are then swaged into the shape shown in Fig. 2 so that the flat inclined sides 20 and 21 and the edge 22 are formed, the thickness of the lips being considerably lessened as they extend outwardly from the underside of the fastener so as to form a lip or lug which is curved into its final convex or segmental form as shown.

The swaging operation strengthens the connection between the ends of the guide lug and the body of the fastener, thus compensating for the slitting of the metal laterally of the lug. It should further be noted that the symmetrical disposition of each guide lug with respect to the medial line causes it to offer a substantially equal resistance to a bending stress applied in either direction.

The method of forming my guide lug as above described is of course not limited in its application to the art of belt fasteners, but is of general application wherever a lug or lugs projecting from the surface of a sheet or plate of metal are desired.

To place the belt fastener in position, the ends of the belt are cut straight across, the plate is positioned upon the ends of the belt so that the lugs or lips 20 abut against the edges $a$ and $b$ of the belt ends A and B so that the fastener is in even position thereon. The rivets 16 are then driven through the holes of the plate into the belt in any approved manner. The opposite end of the belt is then secured to the other side of the plate in the same manner after its end has been brought up into position against the centering lips or lugs.

I do not claim broadly the provision of a centering lug for positioning a belt fastener upon the abutting ends of a belt, for such a structure is old in the patent to Koeb and Houcke No. 88,307, granted March 30, 1869.

What I regard as my invention is the specific form of lug produced and the method of manufacturing the same; that is, stamping the lug out of the metal longitudinally of the belt fastener and subsequently swaging the same into cam shape, thus providing an efficient structure without weakening the fastener, and also providing a centering lug which has strength to resist the stresses and strains of the belt in operation.

Having thus described my invention what I claim as new and desire to secure by Letters Patent is:

1. As an article of manufacture, a metallic belt fastener, a guide lug integral therewith, extending along a medial line thereof between points within the contour of said fastener, said lug having its ends formed integral with said fastener, and its intermediate portion separate therefrom.

2. As an article of manufacture, a metallic belt fastener, a pair of guide lugs integral therewith, extending along a medial line thereof, and symmetrically disposed, each lug having its ends formed integral with said fastener, and its intermediate portion separate therefrom.

3. As an article of manufacture, a sheet metal fastener, having a guide lug formed from the body thereof, projecting at right angles therefrom, and extending between points within the contour of said fastener, said lug being symmetrically severed from said fastener intermediate its ends, and integral therewith at its ends.

4. As an article of manufacture, a sheet metal belt fastener having a pair of substantially semi-circular guide lugs symmetrically disposed between the ends of the longitudinal medial line thereof, and projecting at right angles downwardly therefrom, said lugs being each free at the center and formed integrally with said fastener from metal between two parallel slits therein.

5. As an article of manufacture, a belt fastener symmetrical with respect to both its longitudinal and its transverse axes, rivet holes symmetrically disposed therein, raised portions extending transversely thereof, and a pair of guide lugs symmetrically disposed along the longitudinal axis, each of said lugs being free at its central portion and integral at its ends with said fastener at one of said raised portions.

In witness whereof I have hereunto set my hand at the borough of Manhattan, city and State of New York, this 30 day of June, 1919.

CLARA S. EATON VOSS.

In presence of—
JOHN H. SAMUELSEN.